(12) United States Patent
Ophardt et al.

(10) Patent No.: US 10,464,091 B2
(45) Date of Patent: Nov. 5, 2019

(54) LEVER OPERATED FLUID DISPENSER WITH ROTARY POTENTIOMETER

(71) Applicant: OP-Hygiene IP GmbH, Niederbipp (CH)

(72) Inventors: Heiner Ophardt, Arisdorf (CH); Harald Poepke, Wettenberg (DE); Rainer Duske, Voerde (DE); Sascha Korthauer, Rheinberg (DE)

(73) Assignee: OP-Hygiene IP GmbH, Niederbipp (CH)

( * ) Notice: Subject to any disclaimer, the term of this patent is extended or adjusted under 35 U.S.C. 154(b) by 198 days.

(21) Appl. No.: 15/345,867

(22) Filed: Nov. 8, 2016

(65) Prior Publication Data

US 2017/0136479 A1  May 18, 2017

(30) Foreign Application Priority Data

Nov. 13, 2015 (CA) ..................... 2911934

(51) Int. Cl.
| | | |
|---|---|---|
| *B05B 12/00* | (2018.01) | |
| *A47K 5/12* | (2006.01) | |
| *B05B 11/00* | (2006.01) | |
| *G01F 3/00* | (2006.01) | |

(52) U.S. Cl.
CPC .............. *B05B 12/008* (2013.01); *A47K 5/12* (2013.01); *A47K 5/1211* (2013.01); *A47K 5/1217* (2013.01); *B05B 11/0059* (2013.01); *B05B 11/3009* (2013.01); *G01F 3/00* (2013.01)

(58) Field of Classification Search
CPC ...... A47K 5/12; A47K 5/1211; A47K 5/1217; A47K 5/1214; A47K 2005/1218; B05B 12/008; B05B 11/0059; B05B 11/3009; G01F 3/00; A45D 26/0014; B65D 83/262
USPC .......................... 222/504, 52, 63, 641, 1, 71
See application file for complete search history.

(56) References Cited

U.S. PATENT DOCUMENTS

| | | | |
|---|---|---|---|
| 3,161,850 A | | 12/1964 | Klug |
| 4,343,414 A | * | 8/1982 | Lark ...................... A01C 7/102 111/179 |
| 4,804,118 A | * | 2/1989 | Mullen ................ B67D 3/0003 222/146.6 |
| 5,129,434 A | * | 7/1992 | Whigham ............ B67D 1/0037 141/362 |
| 5,489,044 A | | 2/1996 | Ophardt |
| 6,935,535 B2 | * | 8/2005 | Pandolfi ............. A45D 26/0014 141/375 |
| 7,367,477 B2 | | 5/2008 | Ophardt et al. |
| 7,748,573 B2 | | 7/2010 | Anhuf et al. |
| 8,074,844 B2 | | 12/2011 | Ophardt et al. |
| 8,201,707 B2 | | 6/2012 | Ophardt |
| 8,215,523 B2 | | 7/2012 | Ophardt |
| 8,684,236 B2 | | 4/2014 | Ophardt |
| 8,733,596 B2 | | 5/2014 | Ophardt et al. |

(Continued)

*Primary Examiner* — Charles Cheyney
(74) *Attorney, Agent, or Firm* — Thorpe North and Western, LLP

(57) ABSTRACT

A dispensing apparatus in which product is dispensed by moving, preferably by manually applied forces from a user, an actuation mechanism, preferably a lever, from a first position to a second position and in which a potentiometer sensor, preferably a rotary potentiometer sensor, senses the relative movement of the actuation mechanism with time and permits the amount of fluid dispensed to be accurately calculated.

19 Claims, 14 Drawing Sheets

(56) References Cited

U.S. PATENT DOCUMENTS

| | | | |
|---|---|---|---|
| 2003/0226853 A1* | 12/2003 | Hidle | A47K 5/1217 222/1 |
| 2005/0171634 A1 | 8/2005 | York et al. | |
| 2007/0151984 A1* | 7/2007 | Baker | A61J 1/2089 222/129 |
| 2007/0175919 A1* | 8/2007 | Hortin | B67D 1/0009 222/64 |
| 2009/0125424 A1* | 5/2009 | Wegelin | G01F 11/00 705/28 |
| 2011/0108410 A1 | 5/2011 | Ophardt | |
| 2013/0098941 A1* | 4/2013 | Wegelin | B05B 12/004 222/23 |

* cited by examiner

LEVER OPERATED FLUID DISPENSER WITH ROTARY POTENTIOMETER

SCOPE OF THE INVENTION

This invention relates to a product dispensing apparatus in which forces applied to a lever operate a piston pump to dispense a product and in which a potentiometer sensor, preferably a rotary potentiometer sensor, is mechanically coupled to the lever for accurately measuring the fluid dispensed and, preferably, when the lever is moved by manually applied forces from a user.

BACKGROUND OF THE INVENTION

Various manual dispensers of products are well known for dispensing products such as hand and skin cleaning fluids, whether as liquids or foamed soap. Known such manual dispensers are manually operated in the sense that manual forces are applied to dispense the product. One difficulty which arises with such dispensing apparatus is to provide for timely maintenance, servicing and monitoring such as, for example, to ensure that there is always product to be dispensed and that the dispenser is operating properly.

U.S. Pat. No. 8,021,707 to Ophardt, issued Jun. 19, 2012 teaches a dispensing apparatus including a product dispenser in which product is dispensed by manual movement of an activation mechanism as, for example, by moving a lever with a person's hand, arm or foot. The dispensing apparatus includes an electrical generator for generating electrical energy as a result of the manual movement of the activation mechanism. The relative amounts of electrical energy generated are used to estimate the amount of fluid dispensed and the extent to which a fluid reservoir is full.

The present applicants have appreciated that the arrangements as taught by the above U.S. Pat. No. 8,021,707 to Ophardt, while useful to provide a rough approximation of the amount of fluid dispensed, suffer from a number of disadvantages notably that in some manners of operation of the dispenser in which fluid is dispensed, either no electrical energy is generated or the relative amounts of electrical energy generated do not provide a correlation to the amount of fluid dispensed as to be useful to estimate the fluid dispensed.

The present inventors have appreciated that the manually operated dispensers as taught by the above U.S. Pat. No. 8,021,707 suffer the disadvantage that the relative amount of electrical energy generated by the generator varies considerably under the control of the user since the user controls the force applied by the user to the lever with time in each successive power input stroke. The manual force applied in each power stroke to the lever varies as to: the force applied to the lever with time, the direction the force is applied relative to the lever and the distance over which the force is applied to the lever. This results in a wide variance of: the velocity of the lever over time during each power stroke, the acceleration of the lever with time during each power stroke and angular displacement of the lever in each power stroke. These variances give rise to a variance in the electrical power generated by the generator in each stroke and a disparity between the electrical power generated by the generator in each stroke and the fluid dispensed by the pump.

As one example, the present inventors have appreciated that some users repeatedly short stroke the manually operated lever. In an exemplary dispenser taught by the above U.S. Pat. No. 8,021,707 to Ophardt, a piston in the pump in a full stroke is moved a maximum axial distance in a piston chamber and this full stroke results from the manual movement of the lever in a power stroke through a corresponding full angular extent before the lever is permitted to return to an initial position as under the bias of a return spring. In such typical full stroke operation, a volume of fluid, for example, 2 ml is dispensed and an amount of electrical power is generated which typically has some reasonably estimable relationship to the 2 ml volume of fluid dispensed. A short stroke arises when a user moves the lever an angular extent less than the full stroke before the lever is permitted to return toward the initial position. Many users may move the lever in successive short strokes with each successive short stroke having an angular extent less than about 50% of the full angular extent, and sometimes less than about 10% of the full angular extent. The inventors have appreciated that when a user quickly applies a succession of short strokes of, for example, about 5% or less of the of the full angular extent, the dispenser will dispense the fluid however, the electrical generator will not produce any electrical power. The inventors have appreciated that the electrical generator does not produce power in a very short stroke operation arises due to the shortcomings that when the lever is first moved by a user in a power discharge stroke, the gear train linking the lever to the electrical generator has mechanical play leading to a time delay and needs some time and/or some initial minimal movement for the gear train with its disengagable one-way clutch mechanism to engage so as to drive the generator and the inertia of the generator requires some initial application of rotational force before electrical power is generated. In another manner of operation, when a user applies a succession of, for example, five such short strokes of 20% the of the full angular extent, the dispenser will typically dispense an ample volume fluid for hand cleaning, for example, about 2 ml, however, the electrical generator will typically produce significantly less electrical power, for example, less than 50% and often less than 25% of the electrical energy produced in a single full stroke. Again, this lower production of electrical power is appreciated by the inventors as arising due to the nature of the gear train and inertia of the electrical generator. The present inventors have thus appreciated that some of the arrangements of the type as taught by the above U.S. Pat. No. 8,021,707 to Ophardt suffer the disadvantages that they do not measure operation with fast successive short strokes and may not even provide any indication using the electrical generator that the pump assembly has been activated at all even though fluid may be dispensed.

SUMMARY OF THE INVENTION

To at least partially overcome these disadvantages of previously known devices, the present invention provides a dispensing apparatus in which product is dispensed by moving, preferably by manually applied forces from a user, an actuation mechanism, preferably a lever, from a first position to a second position and in which a potentiometer sensor, preferably a rotary potentiometer sensor, senses the relative movement of the actuation mechanism with time.

The present invention, in one aspect, provides a dispensing apparatus including a product dispenser in which product is dispensed by movement of an activation mechanism as by pivoting a lever with a person's hand, arm or foot and a rotary potentiometer sensor is utilized to determine the relative extent of movement of the lever with time.

The present invention, in another aspect, provides a dispensing apparatus including a product dispenser in which product is dispensed as by movement of an activation mechanism, preferably by pivoting a lever with a person's hand, arm or foot, the apparatus comprising:

a fluid containing reservoir, a dispensing mechanism which on activation causes fluid to be discharged from the reservoir, an activation mechanism for activation of the dispensing mechanism by movement of the activation mechanism, the activation mechanism comprising a lever pivotable about an axis, a potentiometer, the potentiometer coupled to the lever such that on movement of the lever to activate the dispensing mechanism, an electrical characteristic of the potentiometer changes as a function of the extent of movement of the lever, and a control mechanism which:

a) measures the changes in resistance of the potentiometer with time, and b) estimates as a function of said changes in the electrical characteristic of the potentiometer with time an estimated value selected from (i) amount of fluid discharged, and (ii) the angular movement of the lever.

In another aspect the present invention provides a manually operated hand cleaning fluid dispensing apparatus comprising:

a housing, a hand cleaning fluid containing reservoir, a dispensing mechanism comprising a fluid piston pump with a piston slidably received coaxially in a piston chamber member for reciprocal sliding between a retracted position and an extended position to discharge fluid from the reservoir to a discharge outlet, an activation mechanism for activation of the dispensing mechanism by the engagement by a user moving the activation-mechanism, the activation mechanism comprises a lever reciprocally pivotable about a pivot axis between a first axial position and a second axial position relative the pivot axis, the lever having an engagement portion spaced from said pivot axis for engagement by a user to pivot the lever about the pivot axis, the piston mechanically coupled to the lever for sliding of the piston in the piston chamber member with pivoting of the lever and with any pivoting of the lever providing sliding of the piston in the piston chamber member, a rotatable takeoff member mounted to the housing for rotation relative the housing, the takeoff member mechanically coupled to the lever for rotation of the takeoff member relative the housing with pivoting of the lever and any pivoting of the lever providing rotation of the takeoff member relative the housing, a rotary potentiometer disposed between the takeoff member and the housing, the potentiometer having an electrical character that changes as a function of the extent of pivoting of the takeoff member; and a control mechanism which monitors the changes in the electrical characteristic of the potentiometer with time and, preferably, estimates as a function of said changes in the electrical characteristic of the potentiometer with time an estimated amount of fluid discharged.

BRIEF DESCRIPTION OF THE DRAWINGS

Further aspects and advantages of the present invention will be apparent from the following description taken together with the accompanying drawings in which.

DETAILED DESCRIPTION OF THE DRAWINGS

Figure 1:
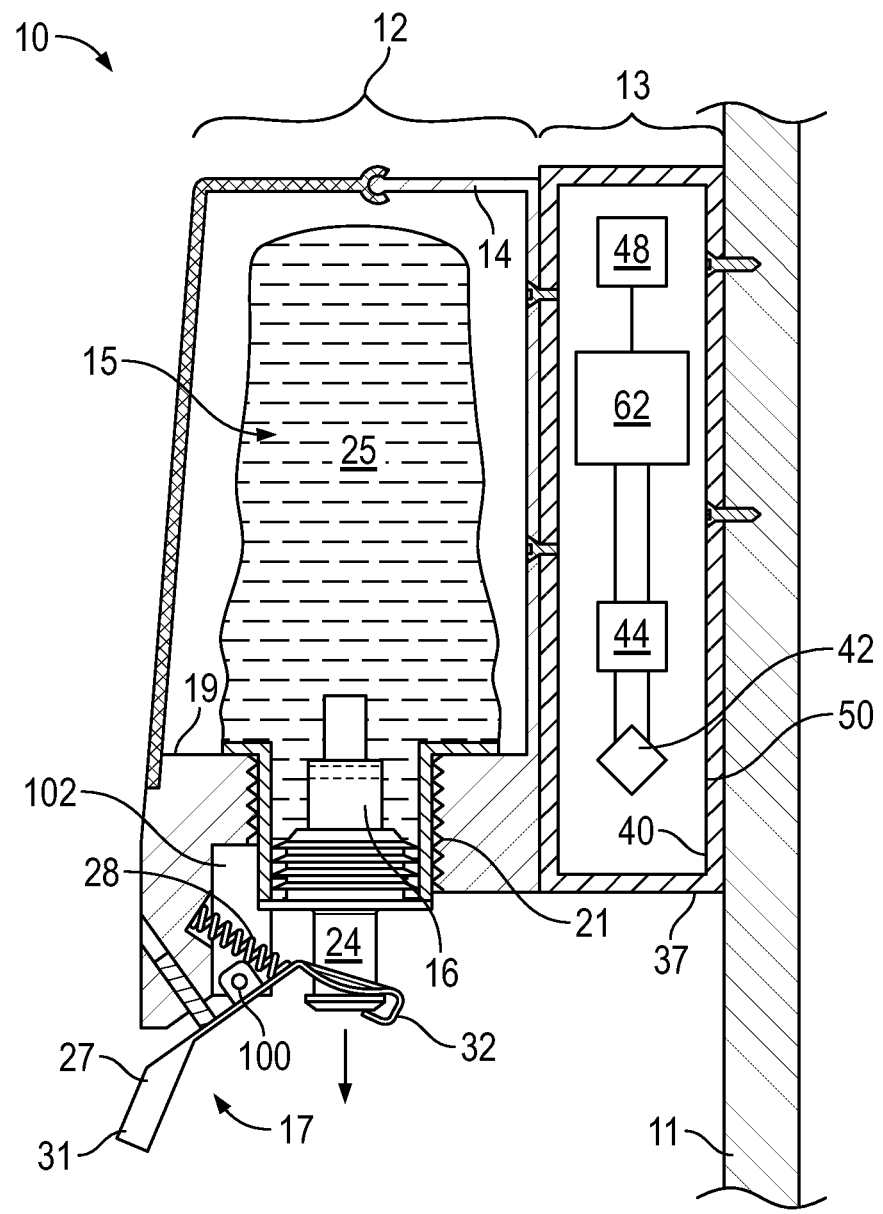
FIG. 1 is a partially cut-away side view of a first preferred embodiment of a fluid dispenser in accordance with the present invention as mounted to a wall with an actuator lever in a forward rest position.
Figure 2:
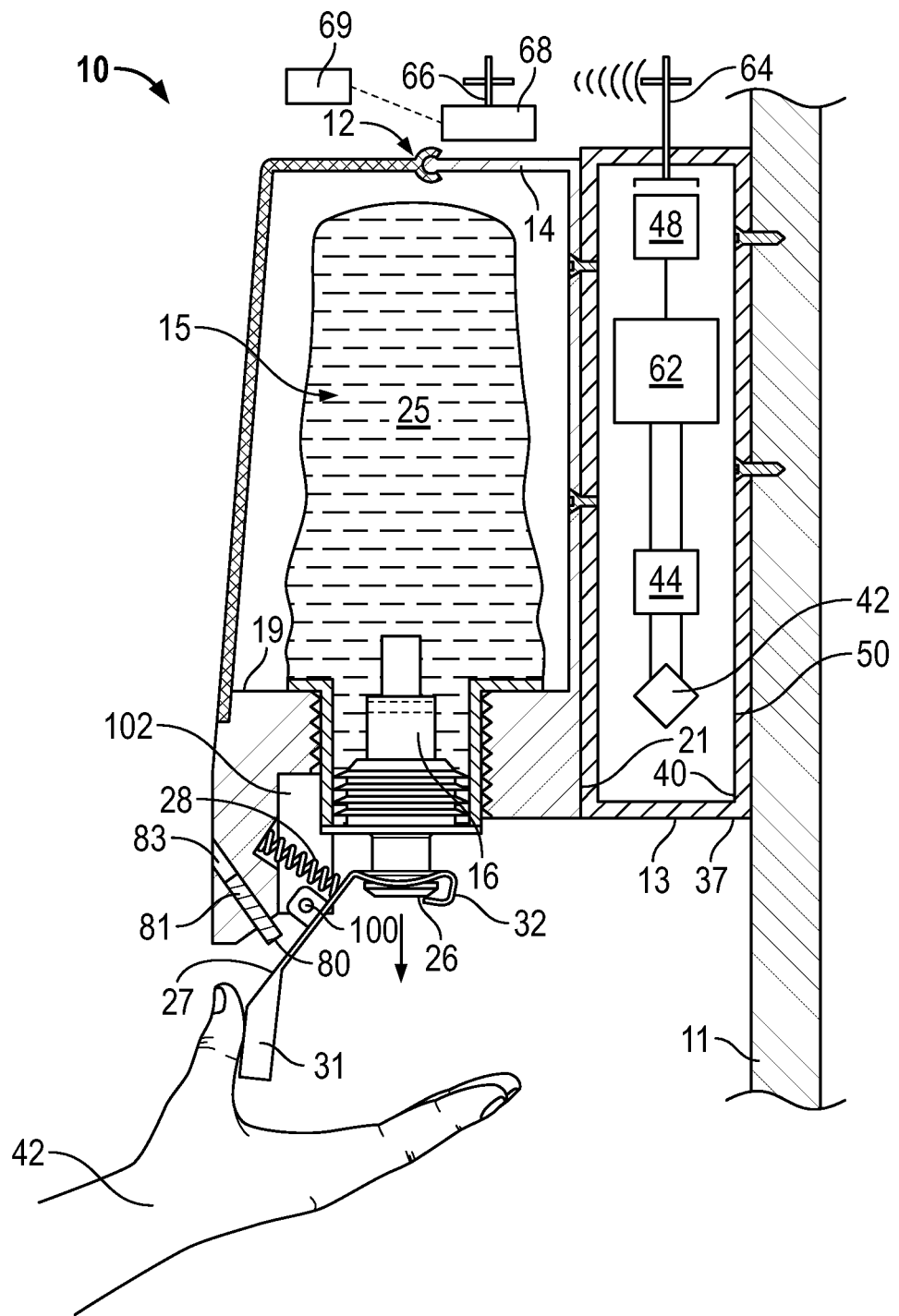
FIG. 2 is a side view the same as FIG. 1 but showing the actuator lever in a rear position.

Reference is made to FIGS. 1 and 2 which show a dispenser assembly 10 mounted to a wall 11. The dispenser assembly 10 includes a dispenser 12 and a back housing 13. The dispenser 12 includes a front housing 14 which carries and supports a reservoir bottle 15, a pump assembly 16 and a lever assembly 17. The dispenser 12 is mounted via its front housing 14 to the front of the back housing 13 and the back housing 13 is mounted to the wall 11.

The dispenser 12 comprises a manually operated fluid dispenser substantially the same as that disclosed in the applicant's U.S. Pat. No. 5,489,044 to Ophardt, issued Feb. 6, 1996, the disclosure of which is incorporated herein by reference.

The front housing 14 is shown to have a bottom support plate 19 to receive and support the bottle 15 and the pump assembly 16. The support plate 19 has a circular opening therethrough. The bottle 15 sits supported on the support plate 19 with a neck 21 of the bottle extending through the opening and secured in the opening as by friction fit.

Figure 3:
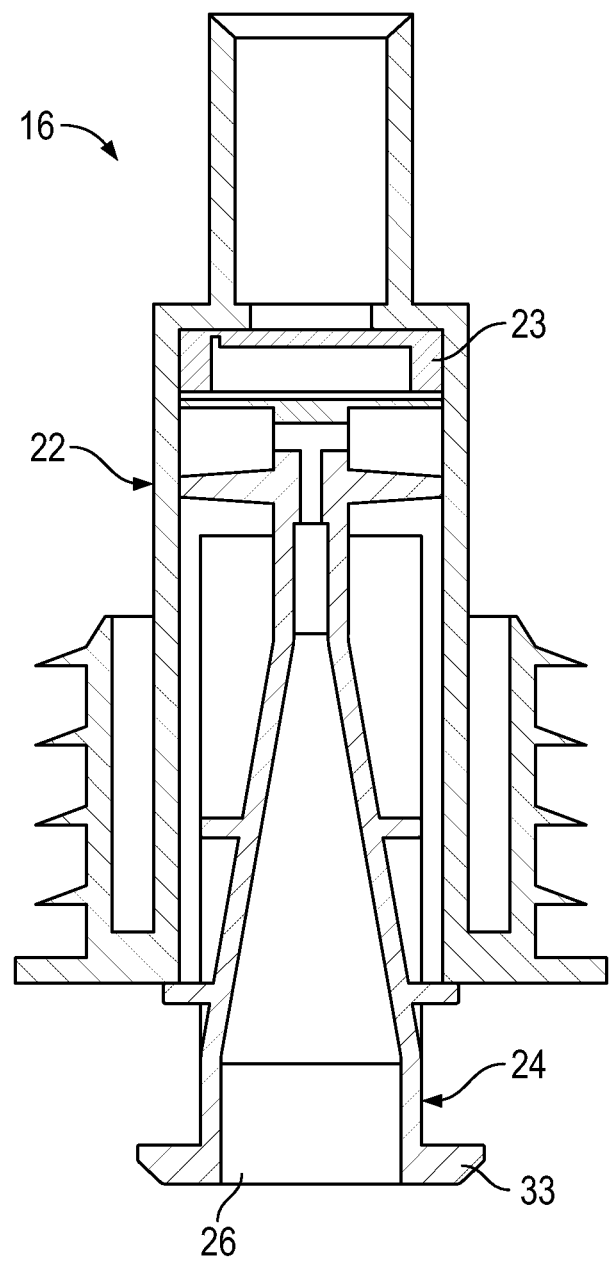
FIG. 3 is a cross-sectional side view of the pump assembly in the fluid dispenser shown in FIG. 1.

The pump assembly 16 has a construction as illustrated in FIG. 3 as taught, for example, in U.S. Pat. No. 5,489,044 to Ophardt, issued Feb. 6, 1996, the disclosure of which is incorporated herein by reference. The pump assembly 16 includes a piston chamber-forming member 22 secured in the neck 21 of the bottle 15. The piston chamber-forming member 22 carries a one-way valve member 23 and an axially reciprocal piston member 24 such that, in a known manner, reciprocal axial movement of the piston member 24 within the piston chamber-forming member 22 will dispense fluid 25 within the bottle 15 out a discharge outlet 26 of the piston member 24.

Figure 4:
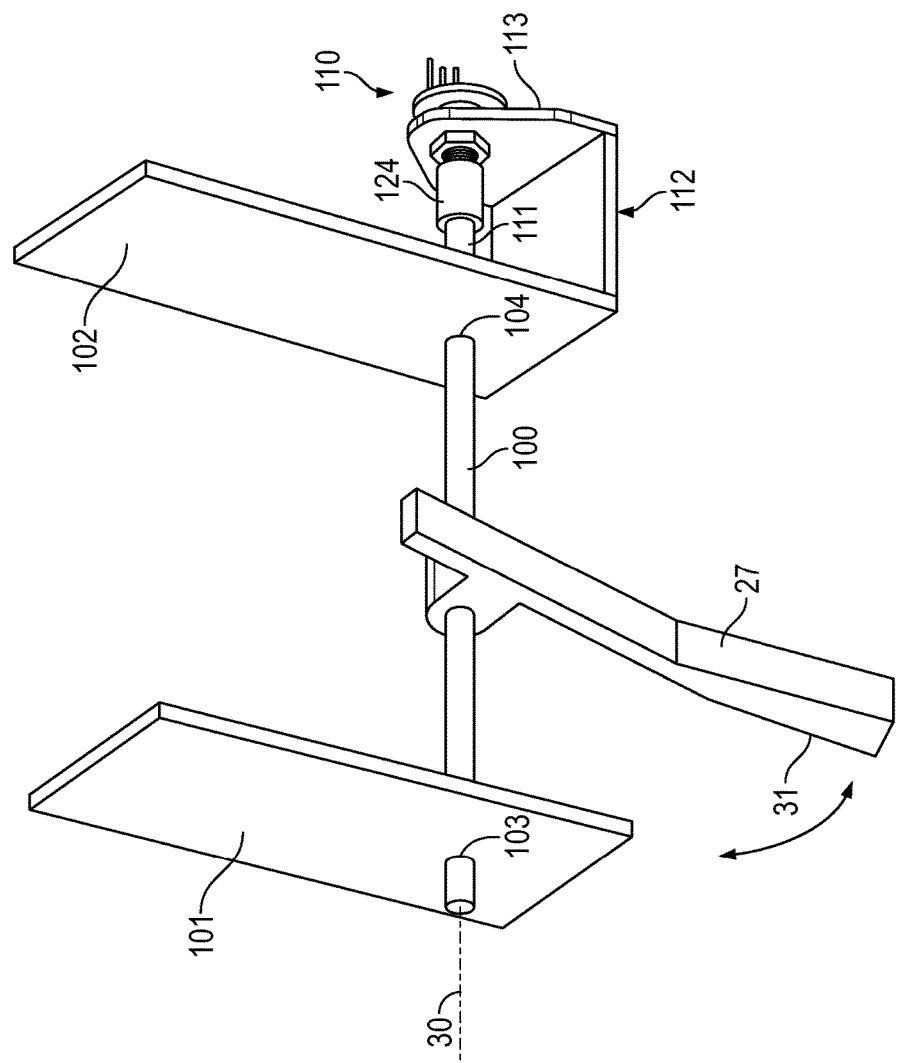
FIG. 4 is a schematic partial pictorial rear view showing the actuator lever of the dispenser in FIG. 1 with an axle of the lever journaled between spaced side plates of a housing of the dispenser and a rotary potentiometer sensor coupled to the axle.

The front housing 14 carries a lever assembly 17 which includes an activating lever 27 and a spring 28. The actuating lever 27 is fixed to a lever axle 100 that extends and is journaled between spaced side plates 101 and 102 supported on the front housing 14 below the bottom support plate 19 as best seen in FIG. 4. The lever axle 100 is journaled in journaling openings 103 and 104 through the side plates 101 and 102 for pivoting of the lever axle 100 and thereby the lever 27 about a horizontal lever pivot axis 30. The spring 28 is disposed between the front housing 14 and the actuating lever 27 and urges the actuating lever 27 to pivot clockwise as shown.

The actuating lever 27 includes a manual engagement handle 31 and a hook member 32. The actuating lever 27 carries forward and downward from the pivot axis 30, the manual engagement handle 31 for engagement by a user to move the actuating lever 27 counter-clockwise against the bias of the spring 28. The actuating lever 27 carries rearwardly from the lever pivot axis 30 the hook member 32 which engages an engagement flange 33 on the piston member 24 such that with pivoting of the actuating lever 27 to different positions about the lever pivot axis 30, the piston member 24 slides axially within the piston chamber-forming member 22.

Reference is made to FIG. 1 which shows the pump assembly 16 with its piston member 24 in an extended position as biased to this position by reason of the actuating lever 27 being biased clockwise by the spring 28 into the stop surface 80 of an adjustable stop member 81 carried on the front housing 14 spaced from the axle 100. With the dispenser assembly 10 in the rest position as shown in FIG. 1, a user may activate the dispenser 12 preferably by manually applying forces in a power stroke with the rear of an upwardly facing palm of a user's hand 42 as shown in FIG. 2, to urge the engagement handle 31 rearwardly towards the wall 11 with the palm and fingers under the discharge outlet 26. In such movement, the actuating lever 27 is pivoted counter-clockwise relative to the bottom support plate 19 against the bias of the spring 28 with the hook member 32 moving the piston member 24 axially inwardly into the piston chamber-forming member 22.

In a cycle of operation of the dispenser assembly 10, the actuating lever 27 is manually moved from the forward rest position in FIG. 1 to the rear position in FIG. 2 and, when released by the hand of a user, the actuating lever 27 then returns under the bias of the spring 28 to the forward rest position.

The stop member 81 is coaxially threadably engaged within a threaded bore 83 in the front housing 14 such that the stop member 81 can be located in different axial positions in the bore 82 to locate the stop surface 80 at different positions to vary the extent to which the lever 27 may pivot counter clockwise and limit the stroke of the piston member 24.

Figure 5:
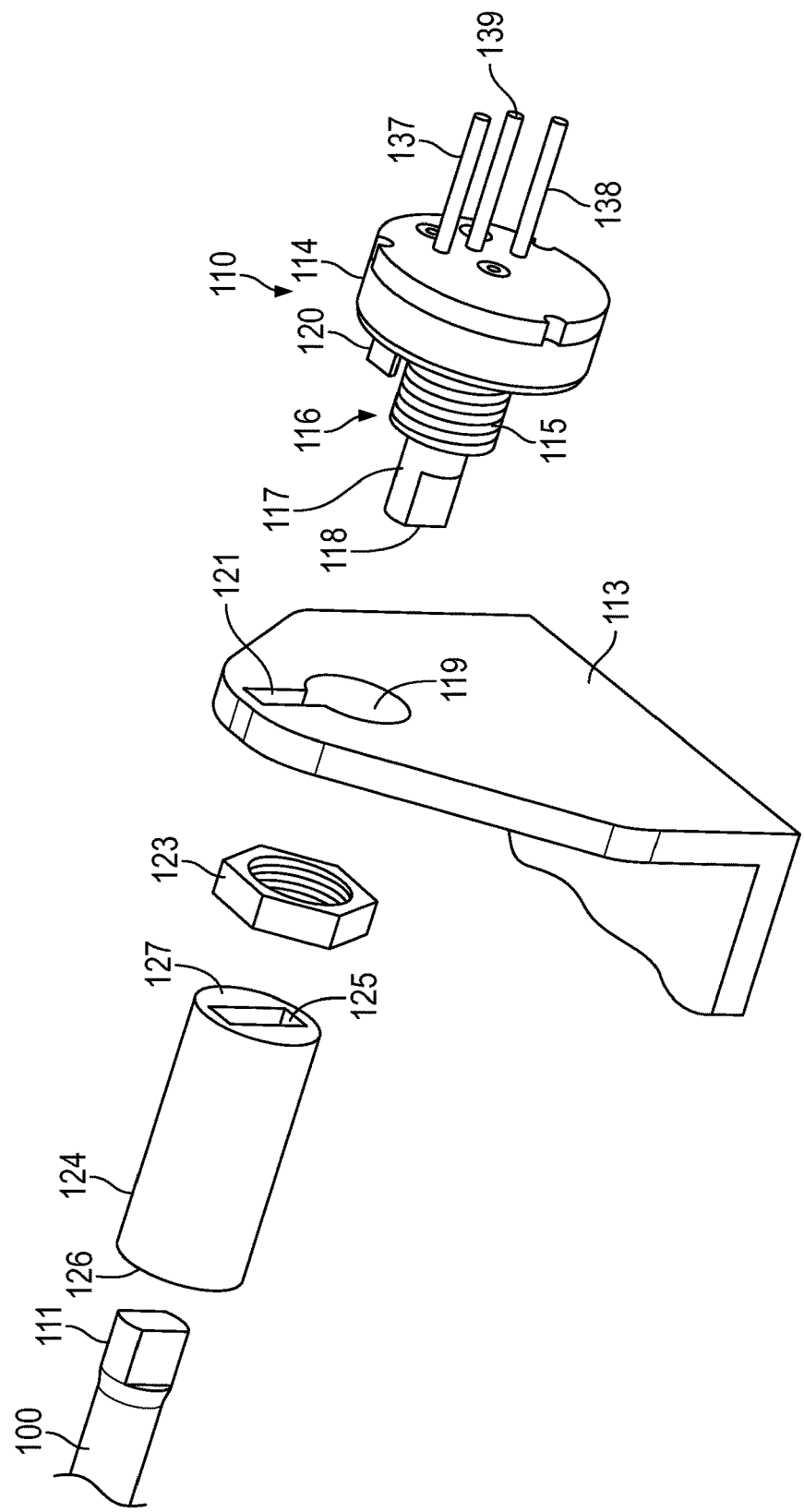
FIG. 5 is a schematic partial exploded pictorial view of portions of FIG. 4 showing the coupling of the axle of the lever and the rotary potentiometer sensor.

As seen in FIGS. 4 and 5, a rotary potentiometer 110 is coupled to a splined distal end 111 of the lever axle 100 for rotation in unison with the lever axle 27. A U-shaped support member 112 is fixedly mounted to the side plate 102 and provides a support flange 113 spaced from the side plate 102 on which the rotary potentiometer 110 is fixedly mounted. As seen in the exploded view of FIG. 5, the rotary potentiometer 110 includes a housing 114 including a projecting cylindrical hub 115. A potentiometer rotor 116 is journaled for rotation within the housing 114 with a driven shaft 117 of the potentiometer rotor 116 journaled within the hub 115. The driven shaft 117 extends coaxially out of the hub 115 and carries a splined end 118. The hub 115 is externally threaded.

The support flange 113 has a keyhole slot 119 with a circular center coaxial with the axis 30 and with a keyway 121 extending radially from the circular center. The housing 114 is fixedly secured to the support flange 113 with the hub 115 extending though the circular center of the keyhole slot 119 and a rearward key projection 120 on the housing 114 being engaged in the keyway 121 of the keyhole slot 119 to prevent relative rotation of the housing 114 on the support flange 113. A threaded nut 123 engages the threads on the hub 115 to draw the housing 114 into the support flange 113.

As seen in FIG. 5, a coupling shaft 124 is provided with a rectangular opening 125 therethrough to slidably engage in one end 126 the splined distal end 111 of the lever axle 100 and, at the other end 127, the splined end 118 of the driven shaft 117 of the potentiometer rotor 116. The coupling shaft 124 couples the lever axle 100 to the potentiometer rotor 116 for rotation about the axis 30 in unison. In this configuration the lever axle 100 acts as a rotatable takeoff member imparting the movement of the lever 27 to the rotary potentiometer 110.

Figure 6:
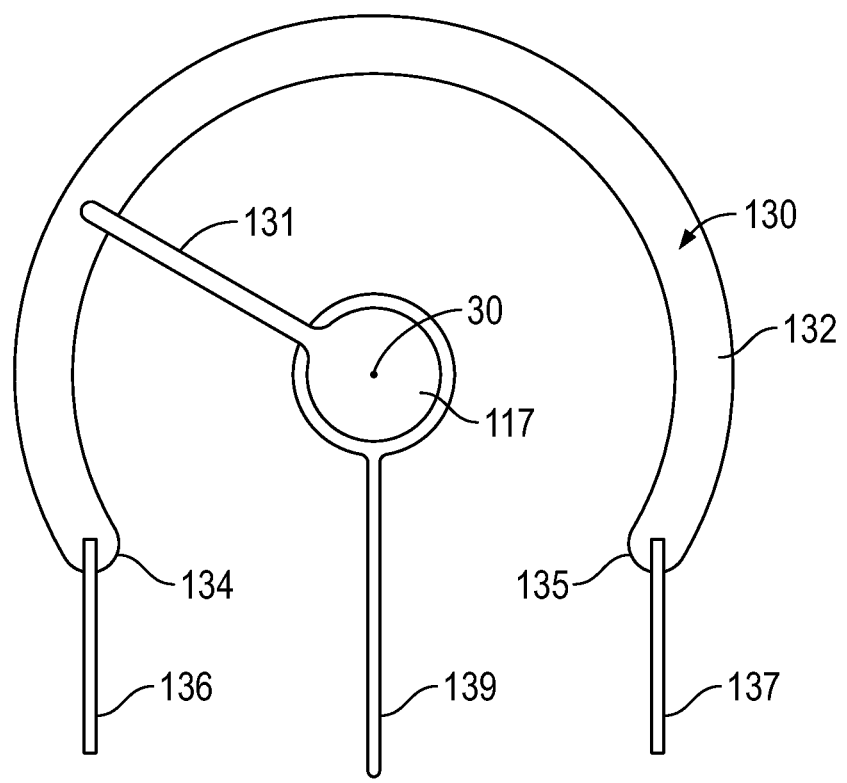
FIG. 6 is a schematic view of the circuit of the rotary potentiometer sensor of FIGS. 4 and 5.

The rotary potentiometer 110 has a known construction similar to that disclosed in U.S. Pat. No. 3,161,850, issued Dec. 15, 1964, the disclosure of which is incorporated herein by reference. The rotary potentiometer 110 of such a known construction is schematically shown in the circuit diagram of FIG. 6. FIG. 6 shows the potentiometer sensor 110 as having a resistive element 130 and a wiper 131. The resistive element 130 is fixedly carried in a cavity within the sensor housing 114 with a contact surface 132 in the form of an arc of a circle about the axis 30 less than 360 degrees about the axis 30 between a first end 134 of the resistive element 130 and a second end 135 of the resistive element 130. A first electrical terminal 136 extends from the first end 134 of the resistive element 130 and a second electrical terminal 137 extends from the second end 135 of the resistive element 130. The wiper 131 is carried on the driven 117 shaft rotatable about the axis 30 with the wiper 131 in constant sliding electrical contact with the contact surface 132 of the resistive element 130. When the wiper 131 is rotated about the axis 30, the wiper 131 slides along the arc of the resistive element 130 between the first end 134 and the second end 135 of the resistive element 130, in constant sliding electrical contact with the contact surface 132 of the resistive element 130. A third electrical terminal 137 extends from the wiper 131. The resistive element 130 provides an electrical resistance between any two points about the arc which resistance is preferably pre-set relationship preferably linear or logarithmic with distance.

The potentiometer 110 may be used utilizing all three terminals or merely two. When all three terminals are used, the potentiometer 110 is, in effect, a three-terminal resistor with the rotating wiper 131 forming an adjustable voltage divider. When two terminals are used, being the wiper terminal 139 and one of the other terminals 136 or 137, then the potentiometer 110 acts as a variable resistor. In either case, an electrical characteristic of the potentiometer 110 changes as a function of the rotational position of the wiper 131 and thereby permits the determination of the relative rotational position of the wiper 131 and the driven shaft 117 carrying the wiper 131. Since the driven shaft 117 rotates in unison with the lever axle 100 on the lever 27, the potentiometer sensor 110 permits a determination of the relative positions of the lever 27 with time. The relative rotational position of the lever 27 correlates to the relative axial position of the piston member 20 in the piston chamber-forming member 22 and the axial movement of the piston member 20 in the piston chamber-forming member 22 correlates to the volume of fluid dispensed. Therefore, by use of the potentiometer sensor 110 to measure the relative rotation of the lever 27 with time the amount of fluid dispensed with time may be calculated. With the arrangement as in FIGS. 1 to 6, if a user moves the lever 27 through but a small rotation, the potentiometer 110 will provide an indication that the dispenser has been activated by movement of the lever 27 even if no fluid or but a small volume of fluid has been dispensed. The rotation of the lever 27 required so that an electrical characteristic of the potentiometer 110 will change can be small, for example, representing pivoting of the lever 27 merely 3 degrees or less, preferably less than 2 degrees and, more preferably, less than 1 degree or ½ a degree. This arises by suitably avoiding for mechanical play between the lever 27 and the rotor 116 for the potentiometer 110 and the sensitivity of the potentiometer 110. The potentiometer 110 as in FIGS. 1 to 6 will therefore provide an indication that the dispenser has been activated in a rapid succession of very short strokes of, for example, about 5% or less of the full angular extent.

The back housing 13 is shown to schematically carry an electrical storage device 44 such as a battery to store electrical power, a controller 62, an optional dispenser sensor unit 46 and a data communications unit 48 in communication with the controller 62 and configured for receiving information from the controller 62 and the potentiometer 110 and the dispenser sensor unit 46 and for transmitting information. The terminals 137, 138 and 139 of the potentiometer 110 are suitably electrically connected to the electrical storage device 44 and the controller 62 although this is not shown in the drawings.

During operation of the dispenser to dispense fluid, the controller 62 monitors the changes in an electrical characteristic of the potentiometer 110 with time and can determine the relative position of the lever 27 with time, the angular rotation of the lever 27 with time and the direction of pivoting of the lever 27, that is, clockwise or counter-clockwise. With knowledge of the configuration of the pump assembly 16, the direction of pivoting of the lever 27 determines whether the lever 27 is moving, for example, in a power discharge stroke to discharge fluid over a return stroke during which fluid is not discharged. From the monitored information from the potentiometer 110, the controller 62 can perform calculations to estimate the fluid dispensed from the reservoir with time. Preferably, the controller 62 calculates the fluid discharged by the pump with time as a pre-set function based on the relative axial movement of the piston member 24 with angular movement of the lever 27 and the bore of the piston chamber-forming member 22.

With knowledge of the volume of fluid in the reservoir at an initial time, the controller can determine at any time the volume of fluid remaining in the reservoir and thus provide signals indicative of different benchmark levels of fluid in the reservoir such as when the reservoir is near to empty of fluid or the reservoir is empty of fluid and needs to be replaced.

Preferably, a re-set mechanism is provided to signal to the controller 62 when a new full reservoir is coupled to the dispenser and/or to advise the controller as to the volume of fluid in any newly applied dispenser. Many different re-set mechanisms may be used. For example, the re-set mechanism may be a manual switch on the controller 62 to be engaged at the time a reservoir is replaced, for example, as a prerequisite to the dispenser operating and with each newly replaced reservoir to be filled with a known volume of fluid. The re-set mechanism may also be provided by the dispenser sensor unit 46 sensing, for example, the replacement of the reservoir and/or the appearance of new information on a label of a replaced reservoir. The controller 62 may monitor data from the potentiometer 110 and define as a single cleaning event data from the potentiometer 110 occurring in a time period between two time periods of inactivity. During each such single cleaning event, the controller 62 can use the data from the potentiometer 110 to calculate the volume of liquid dispensed during the single cleaning event and compare the volume of fluid dispensed with a desired pre-set volume of fluid for a single cleaning event. The desired pre-set volume of fluid for a single cleaning event may typically be equal to the volume dispensed by the pump assembly 16 when moved in a full stroke of the piston member 24 relative to the piston chamber-forming body 22.

The data from the potentiometer may also be used for a number of purposes other than merely determining the volume of fluid dispensed or the volume of fluid in the reservoir. These other purposes include the following.

a) Determining whether in a single cleaning event a user has discharged an adequate volume of fluid for cleaning as, for example, equal to a desired pre-set volume of fluid for a single cleaning event, and sending to the user as by audio or visual indicators a message, for example, either indicating that an adequate dosage of fluid has been dispensed or that less than a normal dosage has been dispensed as to encourage the user to dispense additional fluid.

b) To identify that a short stroke operation of the pump assembly 16 has occurred and/or to provide a message or indication of the short stroke operation to the user. For example, a short stroke operation may be defined as a movement of the piston member 26 less than a full stroke, for example, less than 60% of a full stroke or less than 50% or 40% or 25% of a full stroke. Since in the short stroke operation, the amount of fluid dispensed may be less than a desired amount for a single cleaning event by one user, identifying short stroke operation and/or advising a user of the short stroke operation can be useful as to encourage a user to perform longer strokes and/or to dispense a suitable amount of cleaning fluid. Identifying short stroke operation may be useful in a dispensing mechanism comprising a fluid piston pump with a piston slidably received coaxially in a piston chamber member for reciprocal sliding in a cycle of operation including a retraction stroke and an extension stroke between a retracted position and an extended position to discharge fluid from the reservoir to a discharge outlet. In each cycle of operation of the fluid piston pump the controller 62 compares the determined estimated angular movement of the lever 27 in at least one of the retraction stroke and the extension stroke with a pre-determined full stroke angular movement of the lever 27, and when the estimated angular movement is less than a per-set percentage of the full stroke angular movement of the lever 27, the controller 62 designates the cycle as a short stroke cycle. If the controller 62 designates a plurality of successive cycles of operation as each being a short stroke cycle the controller 62 can take various actions including arranging for an audio or visual message to be provided to the user instructing the user to increase the length of each stroke of the lever.

c) To identify the person using the dispenser. By monitoring and recording the movement of the lever 27 in the operation of the dispenser in each single cleaning event, a database is created of the movements of the lever 27 which occurred in each single cleaning event. Any new single cleaning event that is later monitored and recorded is compared to pre-existing single cleaning events in the database to determine similarities. Where there is a sufficient similarity of the new single cleaning event with one or more pre-existing cleaning events in the database, then the two events may be considered to be performed by the same person. For example, individual persons have been found to apply similar forces and patterns of force application with time to the lever 27 when they use the same dispenser at different times. If it may be advantageous, the identified users could be encouraged by messages towards adopting different movements of the lever that may be more favourable for dispensing of fluid.

d) Determines the position of an adjustable stop member that limits the full stroke of the piston member. In the context of the dispenser of FIGS. 1 to 6, the relative position of the stop member 81 may be determined in a test cycle by manually moving the lever intentionally through a full stroke of operation, for example, from engagement with the stop member 81 counter-clockwise until the piston member 22 is stopped from further inward movement in the piston chamber-forming body 22, then clockwise back to engagement with the stop member 81. The potentiometer 110 is monitored by the controller 62 during this test cycle so as to determine the relative angular pivoting of the lever from which the relative position of the stop surface 80 of the stop member 81 may be calculated. Motor powered fluid dispensers are known in which an electrically powered motor moves a lever like the lever 27 of the preferred embodiments coupled to a piston pump to dispense fluid. In one preferred arrangement, the electrical motor stops movement of the lever in each direction when a sufficiently large resistance to movement is sensed by the electrical circuit for the motor. In such dispensers, adjustable stop members may be provided as in the embodiment of FIG. 1 and also preferably as taught in U.S. Pat. No. 8,074,844 to Ophardt, et al., issued Dec. 13, 2011, the disclosure of which is incorporated by reference. In such a dispenser that an electrically powered motor moves a lever member coupled to a piston pump, the potentiometer coupled for pivoting in unison with the lever can be used to determine the relative position of the adjustable stroke limiting stop member and thus permit an automatic determination by the controller as to the position of the adjustable stroke limiting stop member.

The data communications unit 48 is schematically illustrated in FIGS. 1 and 2 and intended to receive information from the potentiometer 110, preferably via the controller 62, and to transmit information wirelessly as to a wireless receiver. The controller 62 is schematically illustrated as receiving power from the electrical storage device 44 and coupling the potentiometer 110, the optional dispenser sensor unit 46 and the data communication unit 48 for exchange of information and for powering of each for their operation. FIG. 2 schematically shows the data dispensing unit 48 as having an antenna 64 for transmitting information wirelessly to the antenna 66 of a remote wireless receiver 68 only schematically shown.

The optional dispenser sensor unit 46 is independent of the potentiometer 110 that can sense one or more of a wide variety of information about the dispensing apparatus, its use, and environment including, without limitation, any one or more of the following:

i) an indication as to when the reservoir was last replaced with a full reservoir;

ii) the volume of fluid in the replaced full reservoir when replaced;

iii) information about the nature of reservoir 15 which is placed in the dispenser, the fluid in the reservoir and labelling on the bottle 15;

vi) information about the nature of the dispenser;

vii) information about the persons using the dispenser; and viii) room temperature and humidity.

The electrical storage device 44 is described as being a battery including rechargeable batteries, however, various other forms of energy storage devices may be used such as capacitors.

The data communication unit 48 preferably uses wireless communication technology such as is well known in the art and includes Wi-Fi (Wireless Fidelity) and Bluetooth communication technology. The communication may merely be one-way as from the data communication unit 48 to the receiver 68, however, may preferably be two-way communication. The receiver 68 may comprise a remote computer or an interface or gateway for connection between electronic devices such as a remote computer. A gateway may incorporate an http server for accessing data from the data control unit 48 and for transmission of this data back to the data transmission unit 48. The individual dispenser 10 may be accessed as if the dispenser assembly 10 was on a website, and the information could be displayed on a web browser.

Wireless communication to and from the data communication unit 48 is preferred, however, wired communication as along a wired connection from the data communication unit 48 to the receiver 66 is also within the scope of this invention.

Outputs from the data communication unit 48 could be incorporated into known systems and methods for measuring monitoring controlling washroom dispensers and products of the type disclosed in U.S. Patent Publication 2005/0171634 to York et al, dated Aug. 4, 2005, the disclosure of which is incorporated herein by reference.

The dispenser 10 of the first embodiment may have its controller 62 monitor the changes in the electrical characteristics of the potentiometer 110 and perform all calculations necessary without the need to use the data communication unit 48. Alternatively, all or part of the calculations necessary may be performed by computer capability remote from the dispenser with communication through the data communication unit 48.

Figure 7:
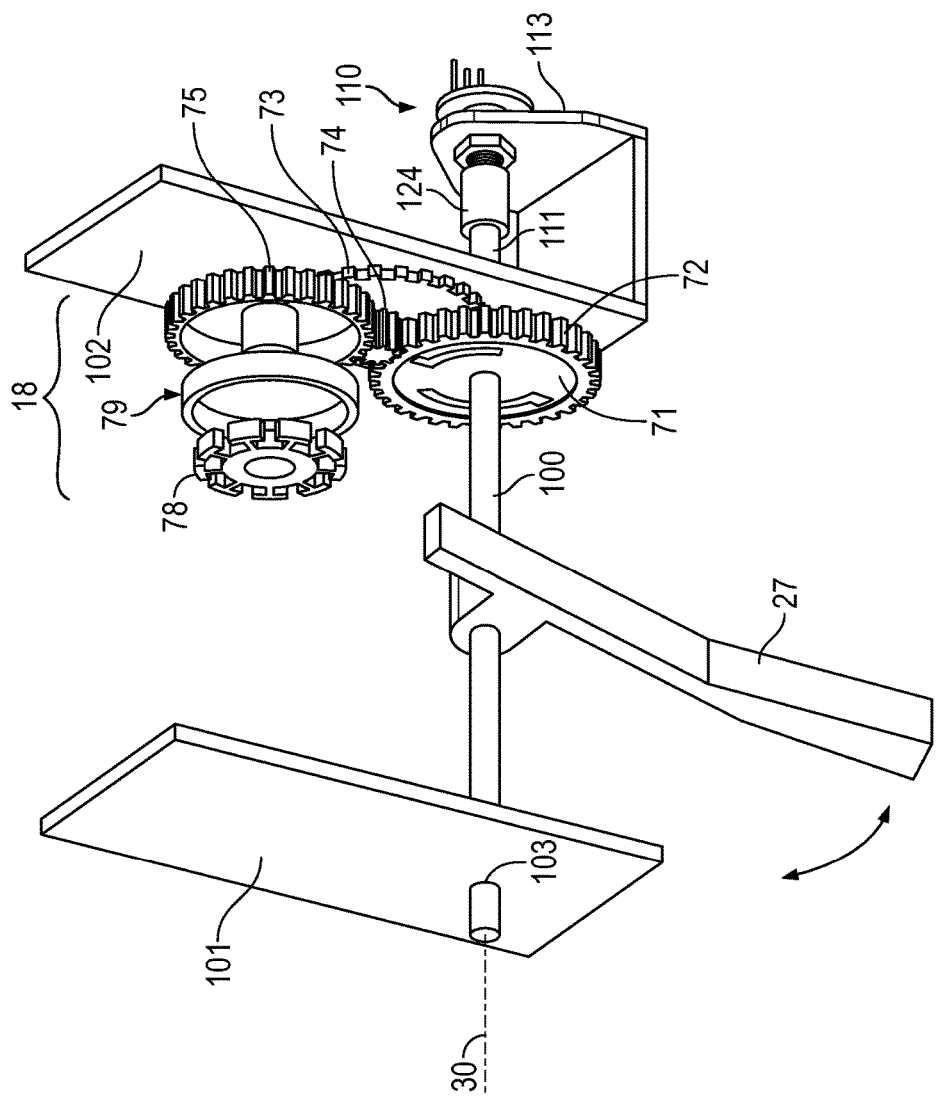
FIG. 7 is a schematic partial pictorial view the same as FIG. 4 but showing a second embodiment including additionally an electrical generator coupled to the axle of the lever by a gear train, and in which the electrical generator is shown schematically and partially in exploded view.

Reference is made to FIG. 7 which schematically illustrates a second embodiment identical to the embodiment of FIGS. 4 to 6 but, additionally, including an electrical generator 18 coupled to the actuating lever 27 by a gear train. In FIG. 7, the actuating lever 27 is only partially shown. The actuating lever 27 is pivotable about the pivot axis 30 with activating lever 27 fixedly secured to the lever axle 100. The lever axle 100 rotates a one-way clutch 71 which rotates an input gear 72. The one-way clutch 71 transfers rotation from the lever axle 100 to the input gear 72 when the lever axle 100 rotates in a first direction and does not transfer rotation from the lever axle 100 to the input gear 72 when the axle member 70 rotates in a second opposite direction.

The input gear 72 transfers motion to an intermediate gear 73. The intermediate gear 73 receives motion from the input gear 72 via a small diameter wheel 74 and transfers motions from the input gear 72 to an alternator assembly via a large diameter gear 75 which meshes with a small diameter rotor gear, not clearly shown on an axial end of a rotor 79 of the alternator assembly. The rotor 79 is in the form of a flattened cup with an axially extending boss and with the small diameter rotor gear mounted on this boss. The intermediate gear 73 transfers motions from the input gear 72 to the alternator assembly and, in doing so at the same time, increases the relatively low speed input from the input gear 72 to a higher speed output. While not shown on the drawings, the alternator rotor 79 has mounted therein magnetic segments 80 which provide the rotor poles. The alternator stator 78 carries on its radial arms copper windings also not shown.

The alternator assembly preferably uses a three phase stator winding with nine stator teeth and twelve rotor pulls making in total six pull pairs. The stator 78 is preferably made up of a number of laminations of thin steel. While the electrical generator 18 is only schematically shown, in a known manner, with rotation of the rotor 79 relative the stator 78, electrical energy is generated. The output from the alternator assembly is preferably taken to a rectification module, not shown, which houses a three phase rectifier which converts the three phase alternating current power output from the alternator assembly to direct current. The output from the rectification module is supplied to the electrical storage device 44 to be stored.

The one-way clutch 71 is adapted to be received coaxially inside the input gear 72 such that rotation of the one-way clutch 71 in a counter-clockwise direction rotates the input gear 72, however, rotation of the one-way clutch 72 in the opposite clockwise direction does not rotate the input gear 72. The provision of the one-way clutch 71 is advantageous insofar as the gearing arrangement provides as in the manner of a fly wheel for continued rotation of the rotor 79 due to the inertia of the rotor and the gear train after initial movement by the lever 27 on a user manually moving the lever and without the need for the spring 28 on returning the lever 27 to the rest position to stop the rotation of the gear train and move the gear train in a reverse direction. With the arrangement as in FIG. 7, if a user moves the lever 27 through but a small rotation, the potentiometer 110 will provide an indication that the dispenser has been activated by movement of the lever 27 even if no fluid or but a small volume of fluid has been dispensed. As with the embodiment of FIG. 1, in FIG. 7, the rotation of the lever 27 required so that an electrical characteristic of the potentiometer 110 will change can preferably be selected to be small since there is little or no mechanical play between the lever 27 and the rotor 116 for the potentiometer 110 and the sensitivity of the potentiometer 110 may be suitably selected as to measure even the smallest rotational movement. The potentiometer 110 in FIG. 7 will also therefore provide an indication that the dispenser has been activated in a rapid succession of very short strokes.

Figure 8:
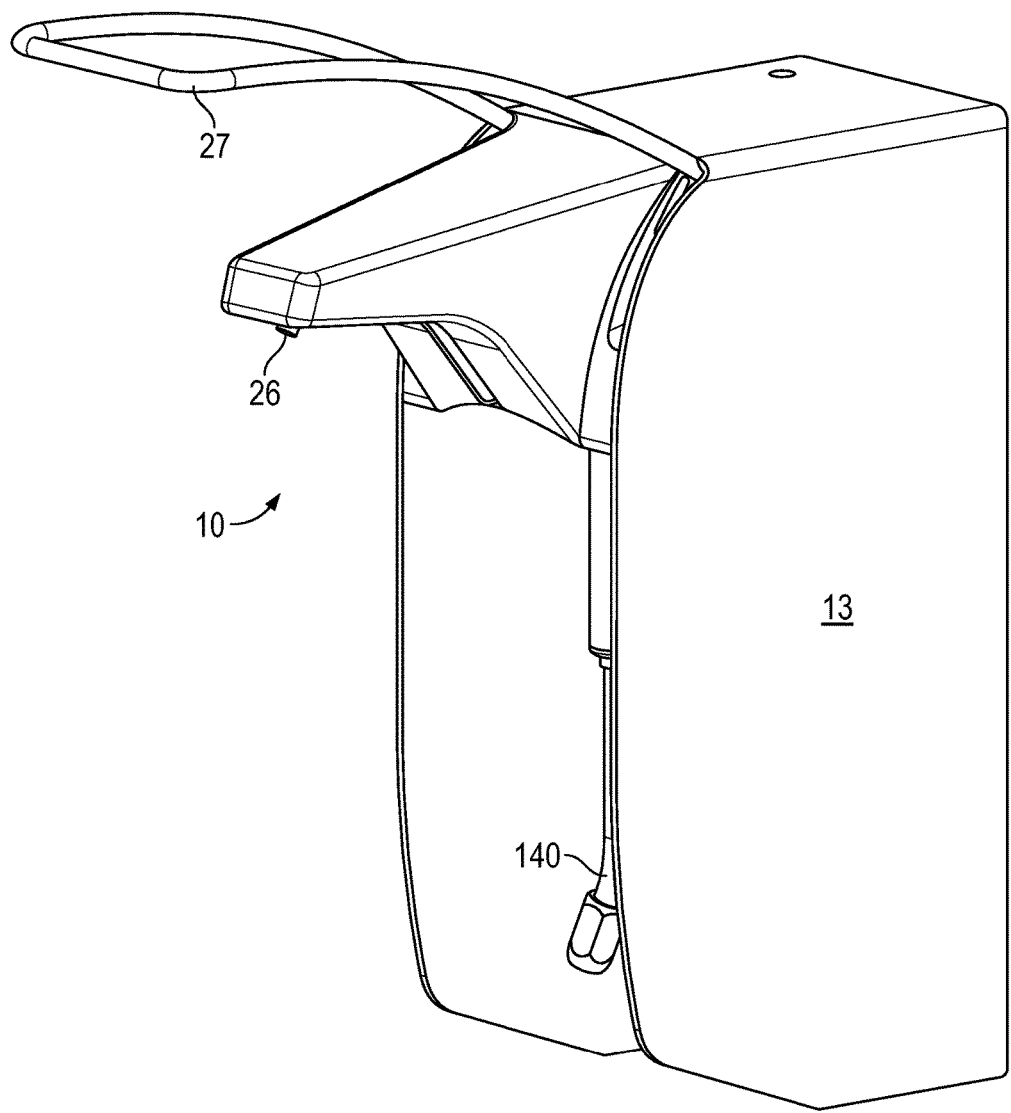
FIG. 8 is a perspective view of a fluid dispenser in accordance with a second embodiment of the present invention.
Figure 9:
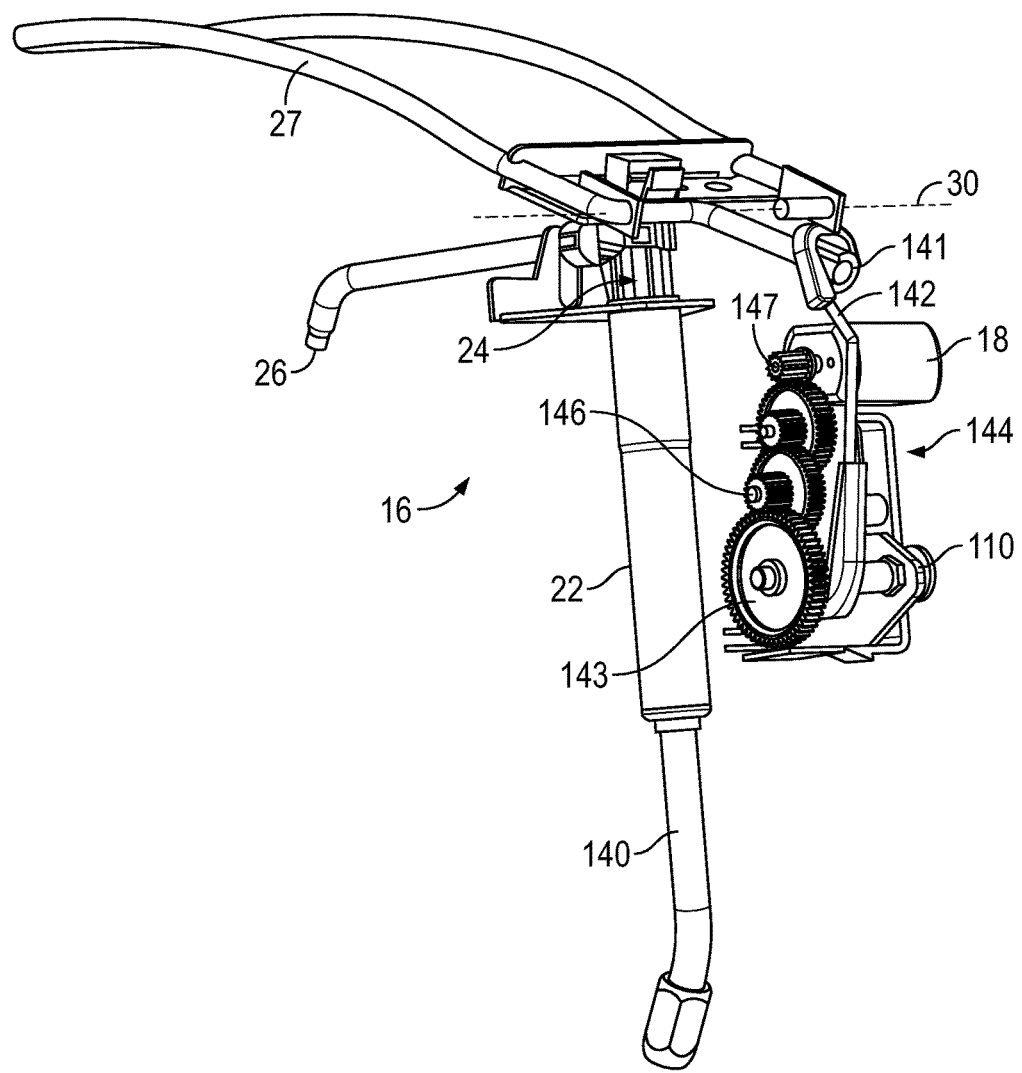
FIG. 9 is a schematic pictorial view of an internal mechanism of the dispenser of FIG. 8.
Figure 10:
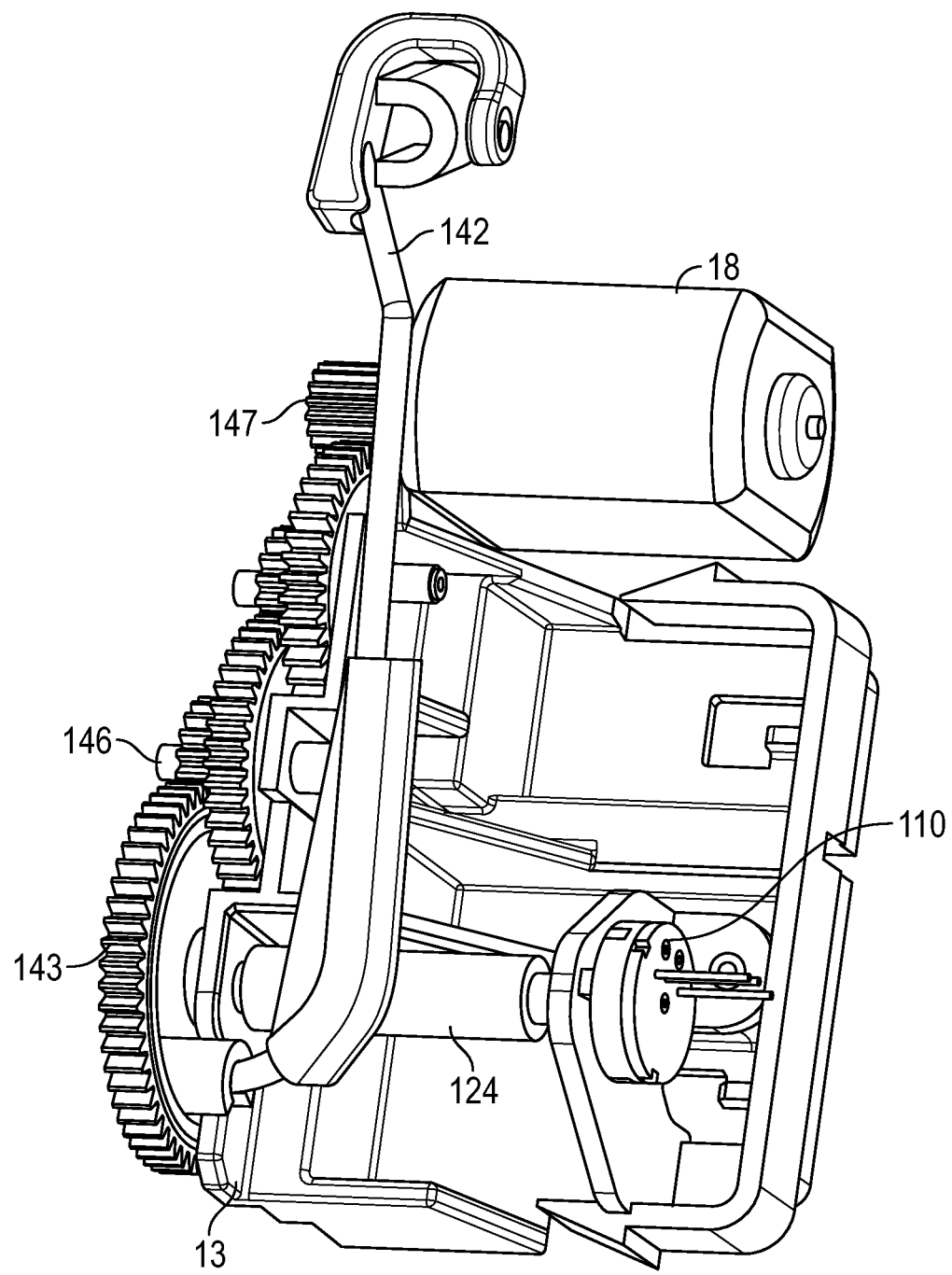
FIG. 10 is a schematic pictorial view of portions of the internal mechanism of the dispenser of FIG. 9.

Reference is made to FIGS. 8 to 10 which illustrate a fluid dispenser 10 in accordance with a second embodiment of the present invention in which similar reference numbers refer to similar elements. The dispenser of FIGS. 8 to 10 has many similarities to the dispensers disclosed in U.S. Pat. No. 7,748,573 to Anhuf, et al., issued Jul. 6, 2010 and U.S. Pat. No. 8,074,844 to Ophardt, et al., issued Dec. 13, 2011, the disclosures of which are incorporated by reference. In FIGS. 8 to 10, a lever 27 is pivotally mounted to the dispenser housing 13 for rotation about an axis 30. A pump assembly 16 includes a piston chamber-forming body 22 is also affixed to the housing. The pump assembly 16 includes a piston member 24 coaxially slidable within the piston chamber-forming body 22 for discharge of fluid drawn from a reservoir, not shown, up a dip tube 140 and out of a discharge outlet 26. The piston member 24 is fixedly connected to the lever 27 for movement in unison therewith. A spring member, not shown, is provided to bias the lever 27 and piston member 24 to an upper raised position.

At a rear end 141 of the lever 27, a connecting rod 142 is pivotally coupled to the lever 27 at its upper end and pivotally connected to a first gear 143 for movement in unison. The first gear 143 is journaled on the housing 13 for rotation relative to the housing. The first gear 143 is also coupled to a potentiometer 110 by a coupling shaft 124 for rotation in unison and in this configuration the first gear 143 acts as a rotatable takeoff member imparting the movement of the lever 27 to the rotary potentiometer 110.

A gear train 144 is provided between the first gear 143 and an electrical generator 18. The gear train 144 is configured such that there is provided a one-way linkage mechanism whereby rotation of the first gear 143 in one direction rotates a rotor 147 for the generator 18 in a first direction, however, on rotation of the first gear 143 in a second direction, a second gear 146 of the gear train 144 disengages by sliding out of disengagement with the first gear 143. As in the first embodiment, in the embodiment of FIGS. 8 to 10, the potentiometer 110 monitors and measures the angular movement of the lever 27 with time and the angular movement of the lever 27 bears a direct correlation to the volume of fluid dispensed by the pump assembly 16. As with the embodiment of FIG. 7, in FIGS. 8 to 10, the rotation of the lever 27 required so that an electrical characteristic of the potentiometer 110 will change can preferably be selected to be small by limiting the mechanical play in the linkage between the lever 27 and the rotor 116 for the potentiometer 110. This linkage includes the connection of the lever 27 to the connecting rod 142 and the coupling of the connecting rod 142 to the first gear 143. Preferably, all the couplings between the lever 27 and the rotor 116 for the potentiometer 110 avoid mechanical play and the lever 27 and the rotor for the potentiometer 110 move in precise unison or with there being less than 2 degrees of rotational play, more preferably, less than 1 degree or less than ½ degrees of rotational play of the lever 27 before the rotation of the lever 27 translates into movement of the rotor 116 of the potentiometer 110. Thus, sensitivity of the potentiometer 110 will be suitably selected. The potentiometer 110 in FIGS. 8 to 10 will also therefore provide an indication that the dispenser has been activated in a rapid succession of very short strokes of, for example, about 5% or less of the full angular extent.

FIGS. 7 and 9 illustrates mechanical electrical generators 18 for generating electricity by rotary movement. It is to be appreciated that various other forms of electrical generators may be used coupled to dispenser 12 such that the reciprocal pivoting movement of the actuating lever 27 to dispense fluid results in the generation of electricity. The particular nature of the types of electrical generators which may be used is not limited.

Figure 11:
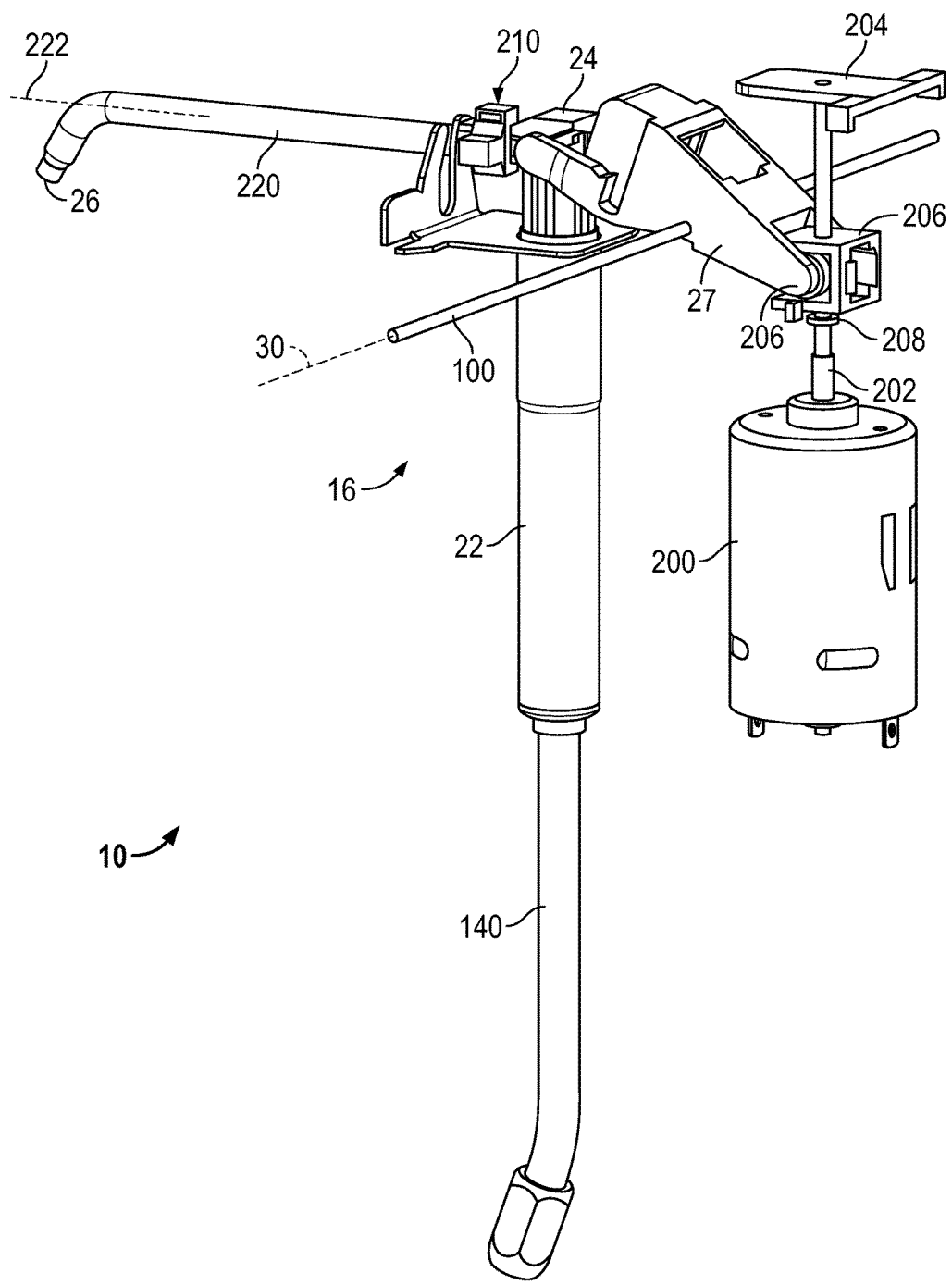
FIG. 11 is a schematic pictorial view of an internal mechanism of the dispenser in accordance with a third embodiment of the present invention.
Figure 12:
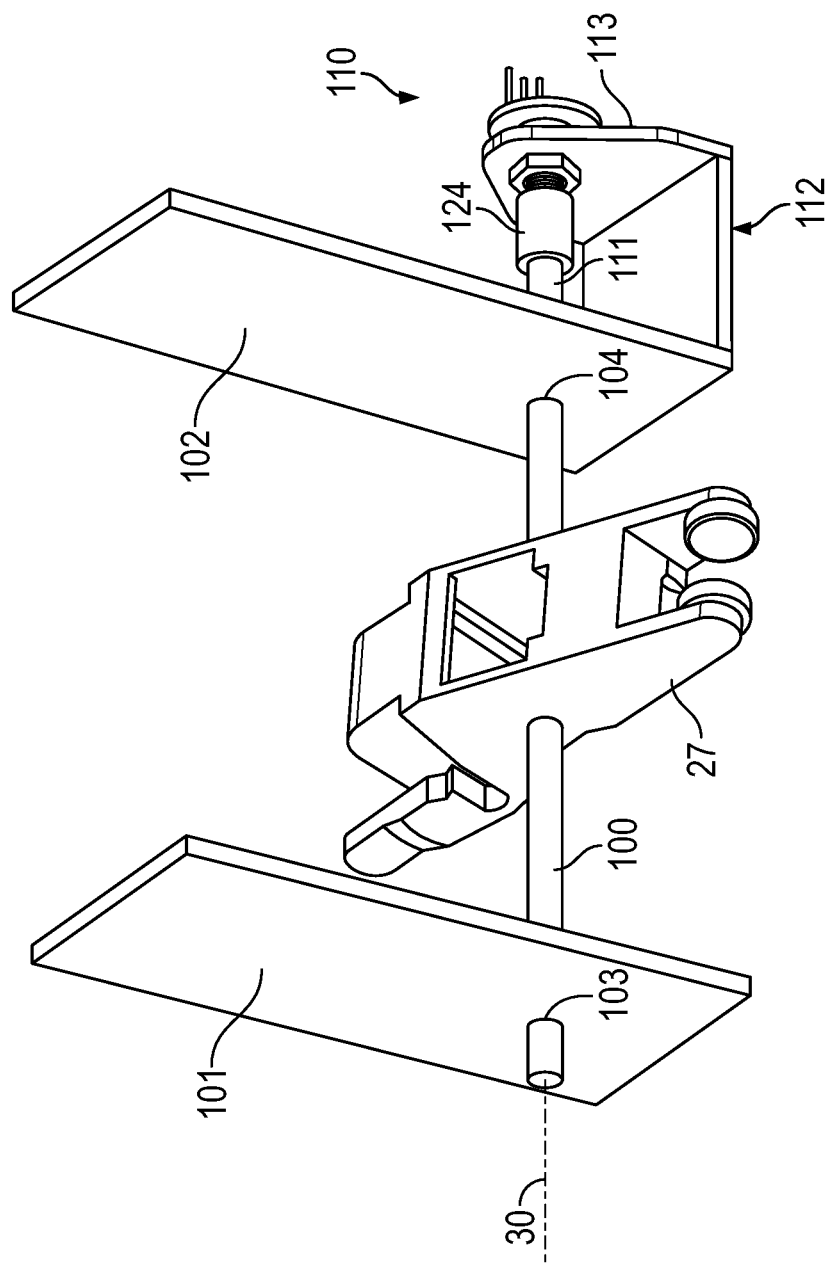
FIG. 12 is a schematic partial pictorial rear view showing the actuator lever of the dispenser in FIG. 11 with an axle of the lever journaled between spaced side plates of a housing of the dispenser and a rotary potentiometer sensor coupled to the axle.
Figure 13:
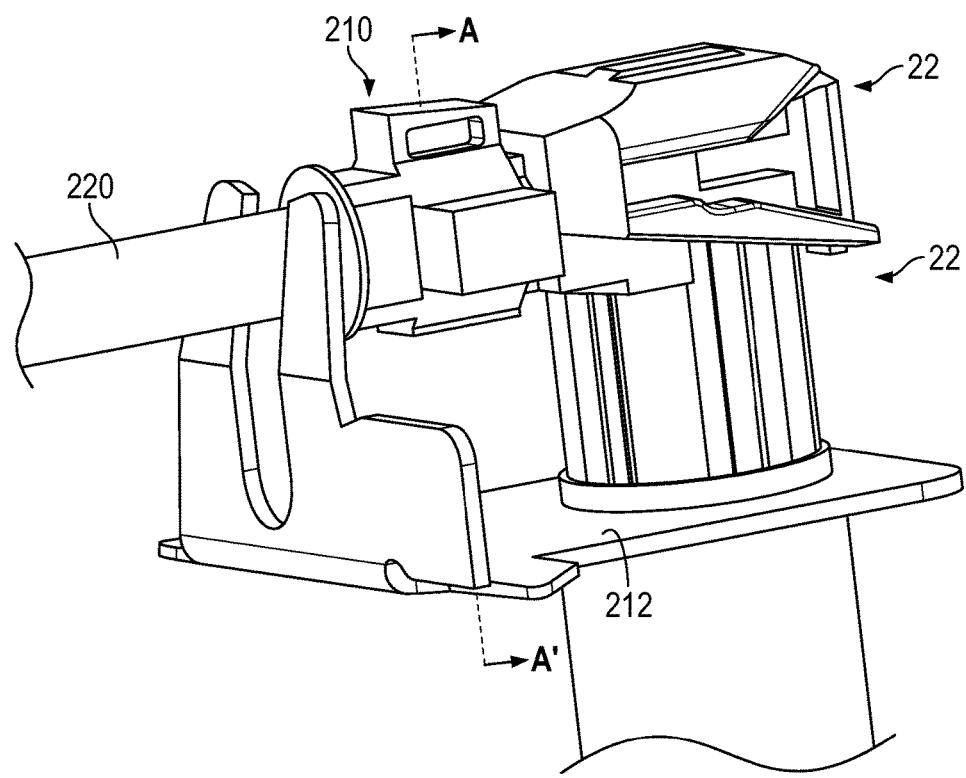
FIG. 13 is an enlarged pictorial view of an upper end of the piston member and piston chamber-forming body of FIG. 11.

Reference is made to FIGS. 11 to 14 which illustrate a fluid dispenser 10 in accordance with a third embodiment of the present invention in which similar reference numbers refer to similar elements. A pump assembly 16 is provided including a piston chamber-forming body 22 fixed to a housing not shown and a piston member 24 coaxially slidable relative to the piston chamber-forming body 22 to dispense fluid drawn from a reservoir not shown up a dip tube 140 and out of a discharge outlet 26. The piston member 24 is pivotally connected to a forward end of a lever 27 for vertical movement in unison together. The lever 27 is fixed to a lever axle 100 that extends and is journaled between spaced side plates 101 and 102 supported on the housing not shown as schematically illustrated in FIG. 12. The lever axle 100 is journaled in journaling openings 103 and 104 through the side plates 101 and 102 for pivoting of the lever axle 100 and thereby the lever 27 about a horizontal lever pivot axis 30.

As seen in FIG. 12, a rotary potentiometer 110 is coupled to the lever axle 100 for rotation in unison with the lever axle 27 about the axis 30 in the same manner as described with the embodiment of FIGS. 1 to 6.

As seen in FIG. 11, an electric motor 200 is fixed to the housing not shown. The electric motor has a vertical output shaft 202 that is selectively rotated by the motor 200 clockwise or counter clockwise. A lower end of the shaft 202 is supported by the motor and an upper end is journaled in a support plate 204 also fixed to the housing not shown. A threaded nut 206 is threadably engaged on the shaft 204 and pivotably mounted to a rear end 206 of the lever 27. With rotation of the motor 200 clockwise the shaft 202 rotates to move the nut 206 upwardly on the shaft 202 pivoting the lever 27 about its axis 30 to move the piston member 24 downwardly relative the piston chamber-forming body 22 to discharge fluid from the discharge outlet 26. With rotation of the motor 200 counter-clockwise, the shaft 202 rotates to move the nut 206 downwardly on the shaft 202 pivoting the lever 27 about its axis 30 to move the piston member 24 upwardly relative the piston chamber-forming body 22. A shaft stop member 208 is secured on the shaft 202 below the nut 206 to stop movement of the nut 206 downwardly and thereby limit pivoting of the lever 27 clockwise. A piston stop member 210 is provided on the piston member 24 with one of downwardly directed stop surfaces 251, 252, 253 and 254 to engage a stop flange 212 on the piston chamber-forming body 22 to stop movement of the piston member 24 downwardly and thereby limit pivoting of the lever 27 counter-clockwise. The dispenser of FIGS. 11 to 14 includes a sensing mechanism, not shown, to sense the presence of a user's hand underneath the discharge outlet 26 and to activate the dispenser to dispense a dose of fluid. On activation, the motor 200 rotates the shaft 202 clockwise to move the nut 206 upwardly, pivoting the lever 27 to move the piston member 24 downwardly until the piston stop member 210 on the piston member 24 engages the stop flange 212 on the piston chamber-forming body 22 at which point the motor 200 has its direction of rotation changed to rotate the shaft 202 counter-clockwise to move the nut 206 downwardly, pivoting the lever 27 to move the piston member 24 upwardly until the nut 206 engages the shaft stop member 208 on the shaft at which point the motor 200 is stopped in a ready position for the next activation. As one preferred manner of control of the motor 200, the electrical power draw or load of the motor 200 is monitored by a controller with the motor 200 stopped when the load increases to above a pre-set threshold as occurs when the piston stop member 210 on the piston member 24 engages the stop flange 212 on the piston chamber-forming body 22 or the nut 206 engages the shaft stop member 208 on the shaft 202. When the threshold occurs while the motor 200 rotates the shaft clockwise, then the controller directs that the motor 200 be then rotated counter clockwise. When the threshold occurs while the motor 200 rotates the shaft 202 counter clockwise then the motor 202 is stopped.

The piston member 24 includes a horizontally extending discharge tube 220 preferably of metal about a tube axis 222. The horizontal discharge tube 220 merges into the downwardly directed discharge outlet 26. The piston stop member 210 is provided about the horizontal portion of the discharge tube 220 engaged on the discharge tube 220 and rotatably journaled about the discharge tube 220 for rotation about the tube axis 222 in a manner similar to that taught in U.S. Pat. No. 8,074,844 to Ophardt, et al., issued Dec. 13, 2011, the disclosure of which is incorporated by reference.

Figure 14:
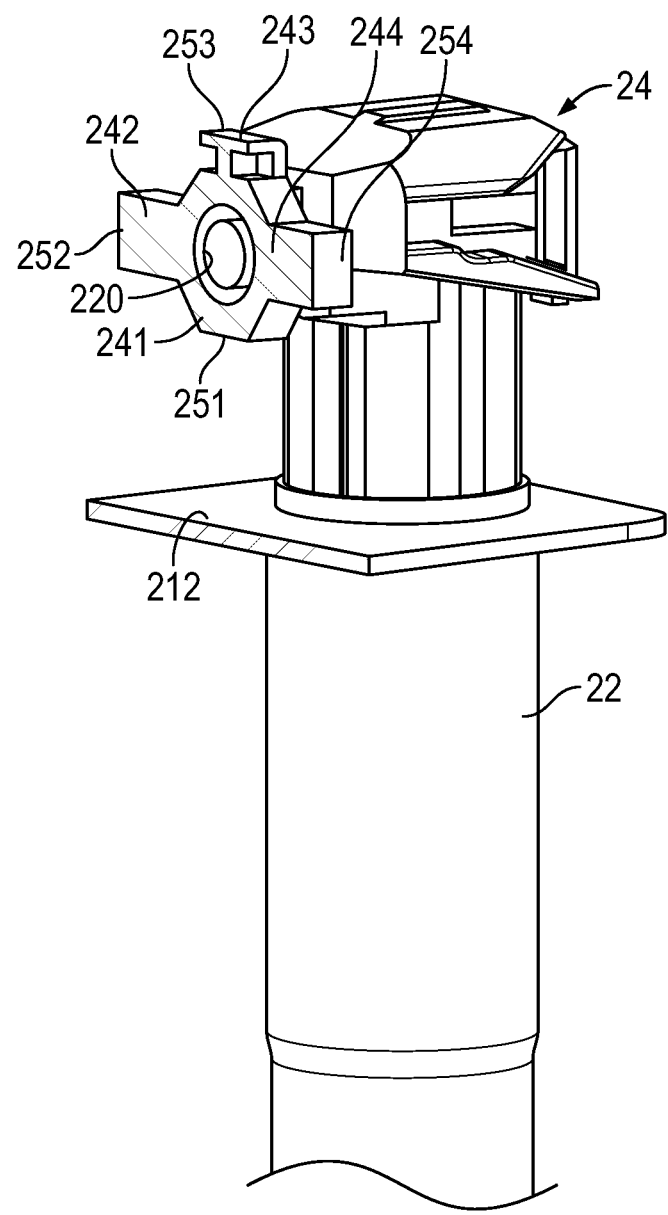
FIG. 14 is an enlarged pictorial view of the upper end of the piston member and piston chamber-forming body view as in FIG. 13 but sectioned along a vertical plane shown as A-A' in FIG. 13.

The piston stop member 210 has four radially outwardly extending stop fingers 241, 242, 243 and 244, each presenting at a distal end a stop surface 251, 252, 253, 254 normal to a radial line extending through a center of each respective stop surface. As measured from the center of each stop surface, each stop surface 251, 252, 253 and 254 is located at a different radial distance from the tube axis 222. FIG. 14 shows a first rotational orientation of the piston stop member 210 in which the first stop finger 241 is directed downwardly toward the upper stop surface of the horizontal stop flange 212 of the piston chamber-forming member 22. In this first rotational orientation, engagement between the stop surface 251 of the first finger 241 and the upper surface of the stop flange 212 limits the extent to which the piston element 24 may be moved downwardly. The piston stop member 210 can be manually rotated about the discharge tube 220 to assume a second rotational position 90 degrees from the first rotational position with engagement between the stop surface 252 of the second finger 242 and the upper surface of the stop flange 212 limiting the extent to which the piston element 12 may be moved downwardly. The piston stop member 210 can be manually rotated about the discharge tube 220 to assume a third rotational position 180 degrees from the first rotational with engagement between the stop surface 253 of the third finger 243 and the upper surface of the stop flange 212 limiting the extent to which the piston element 12 may be moved downwardly. The piston stop member 210 can be manually rotated about the discharge tube 220 to assume a fourth rotational position 270 degrees from the first rotational with engagement between the stop surface 254 of the fourth finger 244 and the upper surface of the stop flange 212 limiting the extent to which the piston element 12 may be moved downwardly. By manually moving the piston stop member 210 to a desired one of the first, second, third and fourth rotational positions, the limit of downward movement of the piston member 24 and thereby the unit volume of liquid that is discharged in a single stroke is manually selected, and may be manually changed.

The piston stop member 210 frictionally engage with the discharge tube 220 and/or with an axially forwardly directed surface of the piston member 24 towards maintaining the piston stop member 210 in any one of the first, second, third and fourth rotational positions until the piston stop member 210 may be manually moved to another position.

The rotary potentiometer 110 can be used in a manner as described with the first embodiment of the invention to determine the relative rotation of the lever 27. With knowledge of the dimensions of the components of the dispenser such as the relative distances between the shaft stop member 208 and the positions on the shaft 202 the nut 206 assumes when the respective stop surface 251, 252, 253 and 254 engage the upper surface of the support flange 212 in the first, second, third and fourth rotational positions respectively, from the rotation of the lever 27 the rotational position of the piston stop member 210 can be determined to be one of the first, second, third and fourth rotational positions. Use of the rotary potentiometer 110 to measure the relative angular movement of the lever 27 in a stroke of operation and thereby determine the rotational position of the piston stop member 210 is useful so as that a controller for the dispenser such as the controller 62 in the dispenser of FIGS. 1 to 6 may know the rotational position of the piston stop member 210 and ensure that the manually set rotational position of the piston stop member 210 is set at a desired position for the dispenser.

A dispenser in accordance with FIGS. 11 to 14 may be characterized as having a dispensing mechanism comprising a fluid piston pump with the piston member 24 slidably received coaxially in the a piston chamber-forming body 22 for reciprocal sliding in a cycle of operation including a retraction stroke and an extension stroke by moving axially between a retracted position and an extended position to discharge fluid from the reservoir to the discharge outlet 26. The motor 200 in at least one of the retraction stroke and the extension stroke pivots the lever 27 about its axis 30 to move the piston member 24 until the piston member's axial movement is stopped by the sandwiching between the housing and the piston member 24 the adjustable piston stop member 210. The piston stop member is movable between the first position and the second position. With the adjustable piston stop member in the first position the piston movement is stopped at a first axial location relative the piston chamber-forming member and with the adjustable piston stop member in the second position the piston movement is stopped at a second axial location relative the piston chamber-forming member different than the first axial location In a cycle of operation of the fluid piston pump the control mechanism with data from the potentiometer 110 utilizes the estimated angular movement of the lever 27 to determine whether the adjustable stop member in the first position or the second position. In an alternate arrangement for use with an electric motor driving the movement of the lever as in FIGS. 11 to 14, an adjustable stop member similar to that shown in FIGS. 1 and 2 may be carried by the housing and the piston member's axial movement is stopped by the sandwiching between the housing and lever 27 the adjustable piston stop member 210.

The first embodiment of the dispenser in FIGS. 1 to 6 includes and is operative using components including the electrical storage device 44, the controller 62, the dispenser sensor unit 46 and the data communications unit 48 which are suitably electrically connected with the potentiometer 110. Similar such components are preferably provided with and used by each of the other embodiments of the dispenser shown in FIGS. 7 to 14. Each embodiment may include as part of the dispenser sensor unit 46 hand sensors to sense the presence of a user's hand under the discharge outlet 26 and reservoir sensors to sense when a reservoir bottle is replaced present or absent. Each embodiment may include audio and/or visual emitters such as lights, speakers and video display to provide indications and messages to a user regarding operation and status of the dispenser.

Rather than utilize a piston pump assembly as shown in FIGS. 1 to 3 which discharges in a retraction stroke, a piston pump assembly could be used which discharges in a withdrawal stroke, that is, when the housing is moving from the forward position to the rear position. The manually operated pump assembly illustrated in FIG. 1 is adapted for applying manual pressure to the manual engagement handle 31 of the lever 27 to move the lever 27 rearwardly relative to the housing. It is to be appreciated that a different arrangement of an activating lever could be provided in which a manual engagement handle is to be moved forwardly away from the wall. An activating lever which is moved forwardly could be used in conjunction with a piston pump which discharges in a withdrawal stroke rather than in a retraction stroke.

The dispenser may have side mounted activation levers such as taught in U.S. Pat. No. 7,367,477 to Ophardt, issued May 6, 2008, the disclosure of which is incorporated herein by reference.

The dispenser is preferably adapted for dispensing fluid onto a user's hand disposed below the dispenser, however, the dispenser can also be adapted to dispense onto a user's hands in front of or to the side of the dispenser.

The preferred embodiments show a fluid dispenser to dispense liquids. The fluid dispensers in accordance with the present invention include dispensers in which the fluid is dispensed as a spray or as a foam. For example, by suitable selection of a pump and nozzle, fluid dispensed may be sprayed as in an atomized mist. Known spray dispensers include dispensers to dispense a spray of alcohol disinfectant onto a person's feet. Foam dispensers provide a foam as by mixing liquid to be dispensed with air.

In the preferred embodiments, the dispenser is shown as a fluid dispenser, preferably a soap dispenser as for use in a washroom or an alcohol cleaning fluid dispenser as for use in hospitals. The dispenser need not be limited to dispensing of fluids onto a person's hands and may be adapted for dispensing in other applications such as to dispense a food product such as ketchup or mustard as used in fast food industries, to dispense cream or milk, to dispense fluid medications as into a cup or receptacle or the like, without limitation.

While the invention has been described with reference to preferred embodiments, many modifications and variations will now occur to persons skilled in the art. For a definition of the invention, reference is made to the following claims.

We claim:

1. A hand cleaning fluid dispenser comprising:
a fluid containing reservoir,
a dispensing mechanism which on activation causes fluid to be discharged from the reservoir,
an activation mechanism for activation of the dispensing mechanism by movement of the activation mechanism,
the activation mechanism comprising a lever pivotable about a pivot axis,
a potentiometer,
the potentiometer coupled to the lever such that on movement of the lever to activate the dispensing mechanism, an electrical characteristic of the potentiometer changes as a function of the extent of pivoting of the lever,
a control mechanism which monitors the changes in the electrical characteristic of the potentiometer with time,
the dispensing mechanism comprising a fluid piston pump with a piston member slidably received coaxially in a piston chamber-forming member for reciprocal sliding in a cycle of operation including a retraction stroke and an extension stroke between a retracted position and an extended position to discharge fluid from the reservoir to a discharge outlet,
the lever reciprocally pivotable about the pivot axis between a first axial position and a second axial position relative the pivot axis,
the piston member mechanically coupled to the lever for sliding of the piston member in the piston chamber-forming member with pivoting of the lever and with any pivoting of the lever providing sliding of the piston member in the piston chamber-forming member.

2. A dispenser as claimed in claim 1 wherein:
the dispensing mechanism has a predetermined relationship estimating the volume of liquid dispensed by the fluid piston pump with the relative pivoting of the lever about the pivot axis, and
the control mechanism calculating from the changes in the electrical characteristic of the potentiometer with time and the predetermined relationship, an estimated volume of fluid dispensed with time.

3. A dispenser as claimed in claim 2 wherein:
pivoting of the lever provides proportional sliding of the piston member in the piston chamber-forming member.

4. A me, A dispenser as claimed in claim 2 wherein:
in each cycle of operation of the fluid piston pump, the control mechanism compares and determines the estimated angular movement of the lever in at least one of the retraction stroke and the extension stroke with a pre-determined full stroke angular movement of the lever, and when the estimated angular movement is less than a pre-set percentage of the full stroke angular movement of the lever, the control mechanism designates the cycle as a short stroke cycle,
if the control mechanism designates a plurality of successive cycles of operation as each being a short stroke cycle, the control mechanism arranges for an audio or visual message to be provided to the user.

5. A dispenser as claimed in claim 1 wherein:
the dispenser including a housing, the lever pivotably mounted to the housing, the piston chamber-forming member mounted to the housing,
the activation mechanism comprises an electrical motor which in at least one of the retraction stroke and the extension stroke pivots the lever about the pivot axis to move the piston member until movement of the piston member is stopped by the sandwiching between the housing and one of the lever and the piston member of an adjustable stop member,
the adjustable stop member is movable between a first position and a second position, with the adjustable stop member in the first position, the movement of the piston member is stopped at a first axial location relative the piston chamber-forming member and, in the second position, movement of the piston member is stopped at a second axial location relative the piston chamber-forming member different than the first axial location,
in a cycle of operation of the fluid piston pump, the control mechanism utilizes the estimated angular movement of the lever to determine whether the adjustable stop member is in the first position or the second position.

6. A dispenser as claimed in claim 1 further comprising:
a housing,
a rotatable takeoff member mounted to the housing for rotation relative the housing,
the takeoff member mechanically coupled to the lever for rotation of the takeoff member relative the housing with pivoting of the lever and any pivoting of the lever providing rotation of the takeoff member relative the housing,
characterized by:
the potentiometer comprising a rotary potentiometer disposed between the takeoff member and the housing.

7. A dispenser as claimed in claim 6 wherein the takeoff member comprises an axle member fixed to the lever and about which the lever pivots relative the housing.

8. A dispenser as claimed in claim 1 wherein:
the lever having an engagement portion spaced from said pivot axis for engagement by a user to pivot the lever about the pivot axis to move the activation-mechanism.

9. A dispenser as claimed in claim 1 wherein
in each cycle of operation of the fluid piston pump, the control mechanism compares and determines the estimated angular movement of the lever in at least one of the retraction stroke and the extension stroke with a pre-determined full stroke angular movement of the lever, and when the estimated angular movement is less than a per-set percentage of the full stroke angular movement of the lever, the control mechanism designates the cycle as a short stroke cycle,
if the control mechanism designates a plurality of successive cycles of operation as each being a short stroke cycle, the control mechanism arranges for an audio or visual message to be provided to the user instructing them to increase the length of each stroke of the lever.

10. A dispenser as claimed in claim 1
the dispenser including a housing, the lever pivotably mounted to the housing, the piston chamber member mounted to the housing,
the activation mechanism comprises an electrical motor which in at least one of the retraction stroke and the extension stroke pivots the lever about its axis to move the piston until movement of the piston member is stopped by the sandwiching between the housing and one of the lever and the piston of an adjustable stop member,
the adjustable stop member is movable between a first position and a second position, with the adjustable stop member in the first position, the piston movement is stopped at a first axial location relative the piston chamber member and, in the second position, movement of the piston member is stopped at a second axial location relative the piston chamber member different than the first axial location,
in a cycle of operation of the fluid piston pump the control mechanism utilizes the estimated angular movement of the lever to determine whether the adjustable stop member in the first position or the second position.

11. A dispenser as claimed in claim 1 wherein the electrical characteristic of the potentiometer comprises the resistance of the potentiometer.

12. A dispenser as claimed in claim 1 wherein:
the control mechanism estimates as a function of said changes in the electrical characteristic of the potentiometer with time an estimated value selected from:
i) amount of fluid discharged, and
ii) the angular movement of the lever.

13. A dispenser as claimed in claim 1 wherein:
the control mechanism estimates as a function of said changes in the electrical characteristic of the potentiometer with time an estimated value selected from:
i) amount of fluid discharged, and
ii) the angular movement of the lever.

14. A hand cleaning fluid dispenser comprising:
a fluid containing reservoir,
a dispensing mechanism which on activation causes fluid to be discharged from the reservoir,
an activation mechanism for activation of the dispensing mechanism by movement of the activation mechanism,
the activation mechanism comprising a lever pivotable about a pivot axis,
a potentiometer,
the potentiometer coupled to the lever such that on movement of the lever to activate the dispensing mechanism, an electrical characteristic of the potentiometer changes as a function of the extent of pivoting of the lever,
a control mechanism which monitors the changes in the electrical characteristic of the potentiometer with time,
a rotary electrical generator for generating electric energy and an electrical storage device coupled to the generator to store electrical power generated by the generator,
the generator comprising an alternator assembly having a rotor and a stator with the rotor rotated relative the stator to generate electrical energy,
a gear train coupling the lever to the rotor to translate motion of the lever into rotation of the rotor only when the lever is rotating in a first angular direction about the pivot axis.

15. A dispenser as claimed in claim 14 wherein:
the gear train including a one-way mechanical clutch mechanism whereby:
i) the lever is connected to and translates the motion of the lever into rotation of the rotor when the lever is pivoting in the first angular direction at a speed greater than a corresponding rotational velocity of the rotor; and
ii) the lever is disconnected from and does not translate the motion of the lever into rotation of the rotor when the lever is (a) pivoting in the first angular direction at a speed less than a corresponding rotational velocity of the rotor or (b) pivoting in a second angular direction about the pivot axis opposite to the first angular direction.

16. A dispenser as claimed in claim 15 wherein the takeoff member comprises one element in the gear train, the one-way clutch mechanism disposed in the gear train between the takeoff member and the rotor.

17. A hand cleaning fluid dispenser comprising:
a fluid containing reservoir,
a dispensing mechanism which on activation causes fluid to be discharged from the reservoir,
an activation mechanism for activation of the dispensing mechanism by movement of the activation mechanism,
the activation mechanism comprising a lever pivotable about a pivot axis,
a potentiometer,
the potentiometer coupled to the lever such that on movement of the lever to activate the dispensing mechanism, an electrical characteristic of the potentiometer changes as a function of the extent of pivoting of the lever,
a control mechanism which monitors the changes in the electrical characteristic of the potentiometer with time,
the dispensing mechanism comprising a fluid piston pump with a piston slidably received coaxially in a piston chamber member for reciprocal sliding in a cycle of operation including a retraction stroke and an extension stroke between a retracted position and an extended position to discharge fluid from the reservoir to a discharge outlet,
in each cycle of operation of the fluid piston pump, the control mechanism compares and determines the estimated angular movement of the lever in at least one of the retraction stroke and the extension stroke with a pre-determined full stroke angular movement of the lever, and when the estimated angular movement is less than a pre-set percentage of the full stroke angular movement of the lever, the control mechanism designates the cycle as a short stroke cycle,
if the control mechanism designates a plurality of successive cycles of operation as each being a short stroke cycle, the control mechanism arranges for an audio or visual message to be provided to the user instructing them to increase the length of each stroke of the lever,
the control mechanism estimates as a function of said changes in the electrical characteristic of the potentiometer with time an estimated value selected from:
i) amount of fluid discharged, and
ii) the angular movement of the lever.

18. A hand cleaning fluid dispenser comprising:
a fluid containing reservoir,
a dispensing mechanism which on activation causes fluid to be discharged from the reservoir,
an activation mechanism for activation of the dispensing mechanism by movement of the activation mechanism,
the activation mechanism comprising a lever pivotable about an axis,
a potentiometer,
the potentiometer coupled to the lever such that on movement of the lever to activate the dispensing mechanism, an electrical characteristic of the potentiometer changes as a function of the extent of pivoting of the lever,
a control mechanism which monitors the changes in the electrical characteristic of the potentiometer with time,
the dispensing mechanism comprising a fluid piston pump with a piston slidably received coaxially in a piston chamber member for reciprocal sliding in a cycle of operation including a retraction stroke and an extension stroke between a retracted position and an extended position to discharge fluid from the reservoir to a discharge outlet,
the dispenser including a housing, the lever pivotably mounted to the housing, the piston chamber member mounted to the housing,
the activation mechanism comprises an electrical motor which in at least one of the retraction stroke and the extension stroke pivots the lever about its axis to move the piston until movement of the piston member is stopped by the sandwiching between the housing and one of the lever and the piston of an adjustable stop member,
the adjustable stop member is movable between a first position and a second position, with the adjustable stop member in the first position, the piston movement is stopped at a first axial location relative the piston chamber member and, in the second position, movement of the piston member is stopped at a second axial location relative the piston chamber member different than the first axial location,
in a cycle of operation of the fluid piston pump the control mechanism utilizes the estimated angular movement of the lever to determine whether the adjustable stop member in the first position or the second position,
the control mechanism estimates as a function of said changes in the electrical characteristic of the potentiometer with time an estimated value selected from:
i) amount of fluid discharged and
ii) the angular movement of the lever.

19. A dispenser as claimed in claim 6 wherein:
the dispensing mechanism has a predetermined relationship estimating the volume of liquid dispensed by fluid piston pump with the relative rotation of the takeoff member, and the control mechanism calculating from the changes in the electrical characteristic of the potentiometer with time and the predetermined relationship, an estimated volume of fluid.

\* \* \* \* \*